US008521969B2

United States Patent
Dixon et al.

(10) Patent No.: US 8,521,969 B2
(45) Date of Patent: Aug. 27, 2013

(54) APPARATUS AND METHOD FOR DIRECTING MICRO ARCHITECTURAL MEMORY REGION ACCESSES

(75) Inventors: Martin G. Dixon, Portland, OR (US); Scott D. Rodgers, Hillsboro, OR (US); James P. Held, Portland, OR (US); Bill Alexander, Hillsboro, OR (US); Larry O. Smith, Beaverton, OR (US); Scott H. Robinson, Portland, OR (US); Sham M. Datta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 11/546,710

(22) Filed: Oct. 11, 2006

(65) Prior Publication Data

US 2008/0091917 A1   Apr. 17, 2008

(51) Int. Cl.
*G06F 12/00* (2006.01)
(52) U.S. Cl.
USPC .................. 711/154; 711/163; 711/E12.001; 711/E12.091
(58) Field of Classification Search
USPC .................. 711/154, 163, E12.001, E12.091
See application file for complete search history.

(56) References Cited

U.S. PATENT DOCUMENTS

| 3,828,327 | A  | * | 8/1974 | Berglund et al. | 710/264 |
| 4,849,927 | A  | * | 7/1989 | Vos | 235/382.5 |
| 5,588,138 | A  | * | 12/1996 | Bai et al. | 711/173 |
| 5,898,867 | A  | * | 4/1999 | Getzlaff et al. | 712/248 |
| 7,093,091 | B2 | * | 8/2006 | DeCaro | 711/163 |
| 2002/0027557 | A1 | * | 3/2002 | Jeddeloh | 345/519 |
| 2002/0078142 | A1 | * | 6/2002 | Moore et al. | 709/203 |
| 2003/0093641 | A1 | * | 5/2003 | Kahn et al. | 711/170 |
| 2006/0212651 | A1 | * | 9/2006 | Ashmore | 711/113 |

* cited by examiner

*Primary Examiner* — Larry Mackall
(74) *Attorney, Agent, or Firm* — Trop, Pruner & Hu, P.C.

(57) ABSTRACT

In an embodiment, memory access requests for information stored within a system memory pass through an integrated circuit. The system memory may include a micro-architectural memory region to store instructions and/or data, where the micro-architectural memory region is to be exclusively accessible by a micro-architectural agent The integrated circuit may include memory access director to direct memory access requests to the micro-architectural memory region if the memory access director determines that the memory access request includes a location within the at least one micro-architectural memory region and the micro-architectural agent is operating in a micro-architectural memory region access mode.

22 Claims, 5 Drawing Sheets

APPARATUS AND METHOD FOR DIRECTING MICRO ARCHITECTURAL MEMORY REGION ACCESSES

FIELD OF THE INVENTION

Embodiments of the invention relate generally to the field of information processing and more specifically, to the field of memory management and protection.

BACKGROUND

Some processors and/or processor logical cores are architected to access a fixed content memory device located within the same physical computer chip package or die as the processor. In such processors, the information within the fixed content memory device may be exclusively used by the respective processor core(s) to implement certain operations. For example, some processors access read only memory (ROM) in order to perform one or more machine instructions (e.g. microcode (μcode)) that correspond to higher level instructions, such as micro-operations ("μops"), and macro-instructions ("user-level" instructions).

Other processor architectures (e.g. instruction set architecture, microprocessor architecture, and/or other processor design aspects) may specify exclusive processor use of a memory device (e.g. erasable programmable read only memory (EPROM)) located external to a computer chip on which one or more processor cores reside. Unfortunately, since fixed content memory devices such as ROMs are not programmable by software running on the processor(s) to which the fixed content memory correspond, subsequent patches, revisions, improvements, enhancements, and/or other changes, etc., cannot easily be made to the content stored within them. The information stored on the fixed content memory device may, however, be protected from being altered by system software and system devices.

To protect the integrity of processor operation, memory used exclusively by components of processor architecture would need some level of protection from being altered by system software and other software and devices. Use of memory content to implement operations used by a processor when the content is infected with a system software virus could lead to system failure. Furthermore, to allow system software and processor(s) to share an un-fixed memory (e.g. information stored in dynamic random access memory (DRAM)), some processors may direct processor access to a region of system memory to store code (e.g., ucode) to implement various processor operations. Unfortunately, as explained above, such a configuration can leave the memory region unprotected and consequently leave the processor vulnerable to corruption.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

At least one method and apparatus for directing micro-architectural memory region accesses within a computer system are disclosed. In the following description, for purposes of explanation, numerous specific details are set forth in order to provide a thorough understanding of embodiments of the present invention. It will be apparent, however, to one skilled in the art that embodiments of the present invention can be practiced without these specific details.

In general, a technique is described for establishing a memory region in a system memory to be exclusively used by a software program. A technique is also described for directing memory accesses generated by a software program to an established memory region, to be exclusively used by the software program.

In at least one embodiment of the invention, a "micro-architectural memory region" is defined in response to a reset signal and then provided a certain level of protection from unauthorized accesses. A micro-architectural memory region may include a region of system memory (e.g. a set of memory locations, each defined by a memory address) that stores instructions and/or data that are to be accessed exclusively by a "micro-architectural agent". A micro-architectural agent may include hardware and/or software within computer system whose structure and/or function are primarily for implementing processor micro-architecture and/or micro-architectural operations. Example micro-architectural agents may include: a microcode engine, processor hardware, processor decoders, arithmetic logic unit, memory management unit, microcode or other processor instructions, and other micro-architectural components, etc.

In some embodiments, a certain level of protection from unauthorized access is provided by software that runs a series of checks before the micro-architectural memory region is allowed to be accessed by a micro-architectural agent. In an embodiment, a series of checks may insure that that all communication paths to a memory region include protection and that overlap between memory regions is not detected, and may insure that other protection/security precautions, etc. are satisfied.

In at least one embodiment of the invention "a memory access director" (e.g. hardware and/or software implementing logic) may be used to direct memory access requests either to the micro-architectural memory region or away from the micro-architectural memory region (e.g. to an abort region of system memory). In an embodiment, whether a request to access the micro-architectural memory region is allowed depends on the location in system memory that has been requested, the source of the request and the source's access mode of operation. For example, in an embodiment, operating system software's request to load instructions from the micro-architectural memory region may be directed to an abort region while the same request from a processor operating in a "micro-architectural memory region access mode" may be allowed.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in an embodiment may be included within other embodiments. The following detailed description is, therefore, not to be taken in a limiting sense, and the scope of the present invention is defined only by the appended claims, along with the full scope of equivalents to which such claims are entitled.

Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

Figure 1:
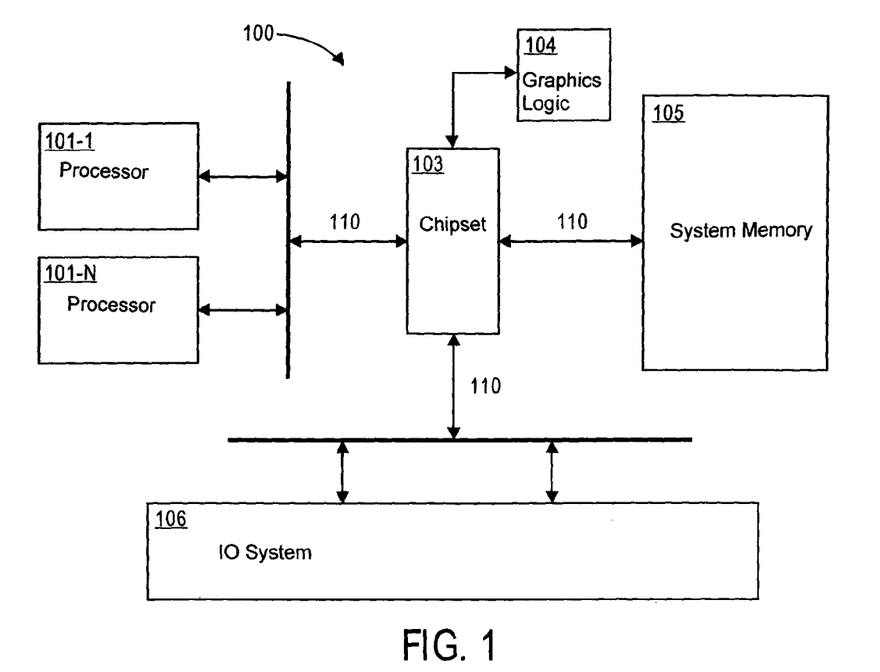
FIG. 1 illustrates a block diagram of an information processing system, in which at least one embodiment of the invention may be used.

FIG. 1 is a block diagram illustrating an information processing system 100. In FIG. 1, chipset 103 facilitates communication between processors 101-1 to 101-N, system memory 105, graphics logic 104 and input/output (I/O) system 106 via communication bus. In an embodiment, chipset 103 is not required for communication between system components (e.g. processor 101-1, system memory 105, graphics logic 104, etc.).

In an embodiment, processors 101-1 to 101-N are integrated circuits to process information (e.g. instructions and data). Processors 101-1 to 101-N may load information (e.g. instructions, data) from system memory 105 and store information (e.g. results of executed instructions) to system memory 105. In an embodiment, processors 101-1 to 101-N may each include a micro-architectural agent (not shown, discussed in further detail below) that may facilitate micro-architectural operations (e.g. by generating microcode, storing instructions, loading data, and/or performing other micro-architectural operations, etc.). In an embodiment processors 101-1 to 101-N are part of a central processing unit (CPU) that maintains control of a computer system. In an embodiment, processors 101-1 to 101-N may control operation of a particular component of a computer system (e.g. memory controller, bus controller, I/O controller, and other device controllers, etc.).

In an embodiment, chipset 103 includes integrated circuitry that includes circuitry to coordinate and bridge communication between processors 101-1 to 101-N, system memory 105, graphics logic 104 and I/O system 106. In an embodiment, chipset 103 includes a graphics memory controller hub (GMCH) and an I/O controller hub (ICH). In an embodiment, the GMCH controls communication between processors 101-1 to 101-N, system memory 105 and graphics logic 104 while the ICH controls routing traffic between various I/O devices (not shown) within I/O system 106.

In an embodiment, graphics logic 104 is logic to process video and/or graphics related information. In an embodiment, graphics logic 104 is located external to the chipset on a motherboard and includes processor circuitry and I/O ports to send and receive control signals, data and to access memory. Alternatively, graphics logic 104 may be built into the chipset.

In an embodiment, system memory 105 is addressable by processor 101 to 101N and other system hardware and/or software. In an embodiment, system memory 105 is to store information for information processing system 100. System memory 105 may include any of the various types of memory known in the art (e.g. volatile memory such as dynamic random access memory (DRAM) etc., and non-volatile memory such as read only memory (ROM), flash, or a combination of volatile and non-volatile memory). System memory 105 may also include different levels of a memory hierarchy (e.g. disk storage, main memory DRAM, cache, etc.).

In an embodiment, I/O system 106 includes devices within information processing system 100 that communicate with processor 101-1 to 101-N and provide information processing functions that are secondary (e.g. peripheral) to those provided by processor 101-1 to 101-N, chipset 103 and system memory 105. In an embodiment, I/O system 106 includes a hard disk, CD ROM device, display monitor, keyboard, mouse and other peripheral I/O devices known in the art, etc. (not shown).

Figure 2:
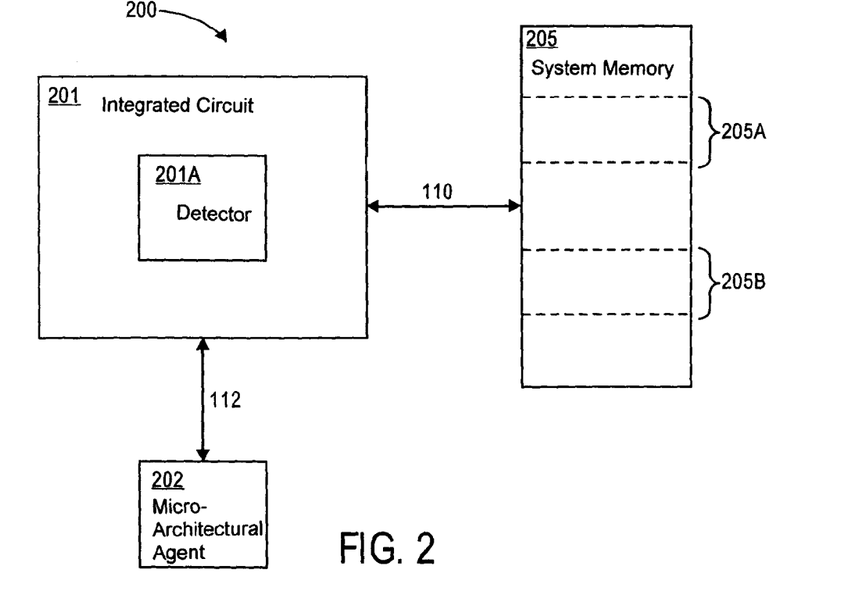
FIG. 2 illustrates a block diagram an information processing system, in which at least one embodiment of the invention may be used.

FIG. 2 is a block diagram 200 illustrating an information processing system 200 in which at least one embodiment may be used. Integrated circuit 201 may be circuitry to communicate with system memory 205 via a communication bus. In an embodiment, integrated circuit 201 may be a processor, such as processor 101-1 in FIG. 1. In an embodiment, integrated circuit 201 may be chipset 202 such as chipset 103 in FIG. 1. In FIG. 2, system memory 205 may be the same or similar in structure and/or function to that disclosed in FIG. 1.

In an embodiment, system memory 205 may include micro-architectural memory region 205*a* to store instructions and/or data (e.g. microcode and processor state information). In an embodiment, micro-architectural memory region 205*a* may include various system memory 205 locations defined by a "start-of-the-memory-region" and an "end-of-the-memory region" (see discussion of FIG. 3 below). In an embodiment, micro-architectural memory region 205*a* is for exclusive use by micro-architectural agents (e.g. micro-architectural hardware and/or software specific to system micro-architecture (e.g. micro-architectural agent 202)). The micro-architectural memory region 205*a* may be considered exclusive ("private") to micro-architectural agent 202 because no macro-architectural agent (e.g. devices, OS, IA-32 software, etc.) in information processing system 200 can access the micro-architectural memory region 205*a*.

Micro-architectural memory region 205*a* may be logically subdivided into sub-regions (not shown), each being allocated to a particular micro-architectural agent 202 or agents. In an embodiment, micro-architectural memory region 205*a* or a subdivision is powered by a power source or circuit (collectively referred to as "power plane") separate from other system memory 205 locations. In an embodiment, the memory locations defining micro-architectural memory region 205*a* are contiguous but embodiments of the invention are not limited to the micro-architectural memory region 205*a* being composed of contiguous memory locations. Non-contiguous micro-architectural memory region 205*a* may use a "virtual memory" organization software and additional hardware to facilitate memory management.

Micro-architectural memory region 205a or its sub-regions may store instructions and/or data. In an embodiment, micro-architectural memory region 205a stores encrypted information (e.g. code/data stored in the region may be decrypted on reads and encrypted on writes to the region). In an embodiment, the use of micro-architectural memory region 205a may include but is not limited to: storage for microcode or microcode data; storage of encrypted or unencrypted microcode patches; shared memory region for processor hardware and/or microcode to implement inter-processor communication and other multi/many core features; storage of processor or platform specific state (e.g. caching of implementation-dependent micro-architectural state for performance purposes, microcode scratch or temporary state variables, power management state, etc.); and storage of special-purpose instruction set architecture implementing new platform or processor features. Micro-architectural memory region 205a or its sub-regions may also be assigned the various memory caching types know by one having ordinary skill in the art (e.g. writeback (WB), writethrough (WT), write combining (WC) uncacheable (UC), and other caching memory types, etc.).

In addition to the micro-architectural memory region 205a, system memory 205 may include additional memory regions, such as an abort region 205b. In an embodiment, abort region 205b may serve as the target of accesses to micro-architectural memory region 205a if micro-architectural memory access mode detector 201a determines that micro-architectural agent 202 is not operating in a mode in which micro-architectural memory region 205a is accessible. In an embodiment, accessing an abort region may result in the access being ignored, flushed from the processor, or simply returning a null value (e.g., zero) to an agent or program accessing the abort region. In an embodiment, abort memory region 203b may include a set of one or more contiguous or non-contiguous system memory locations.

As introduced above, micro-architectural agent 202 may include hardware and/or software within computer system whose structure and/or function are primarily for implementing processor micro-architecture and/or micro-architectural operations. Furthermore, the operation of micro-architectural agent 202 may include facilitating micro-architectural operations (e.g. operating processor hardware, executing processor instructions, generating processor instructions within a processor, etc.). In an embodiment, micro-architectural agent 202 is included as hardware and/or software in a processor and may facilitate intra-processor operations. For example, in an embodiment, micro-architectural agent 202 may be a microcode engine that interacts with microcode stored in ROM within a processor. In an embodiment, micro-architectural agent 202 may provide a set of low level instructions (e.g. microcode) corresponding to a set of higher level instructions (e.g. operation code). Other embodiment(s) may include a micro-architectural agent 202 located external to a processor.

In an embodiment, micro-architectural agent 202 may operate in various modes including a normal mode and a micro-architectural memory access mode. In an embodiment, when operating in the normal mode, micro-architectural agent 202 may be allowed to access portions of system memory 205 to facilitate macro-architectural operations. A macro-architectural operation may be an operation originated by a macro-architectural agent (not shown). A macro-architectural agent may be, for example, an operating system, application software, or other system software, etc. In an embodiment, a macro-architectural agent is not a micro-architectural agent and vice versa.

In an embodiment, when operating in a micro-architectural memory access mode, micro-architectural agent 202 may be allowed to access micro-architectural memory region 205a to facilitate micro-architectural operations. A micro-architectural operation may be an operation originated by micro-architectural agent 202 (e.g. a microcode load operation to cause instructions and/or data to load to a processor from system memory 205). In an embodiment, when micro-architectural agent 202 is operating in either of the normal mode and the micro-architectural memory access mode, micro-architectural memory region 205a is not accessible by operations originated by macro-architectural agents (e.g. operation code instructions from system software may not access the micro-architectural memory region). In an embodiment, when operating in the micro-architectural memory access mode, micro-architectural memory region 205a may be accessible by operations originated by micro-architectural agent 202.

In an embodiment, memory access director 201a may include logic to determine whether or not a memory access request to the micro-architectural memory region 205a originates from micro-architectural agent 202 operating in the micro-architectural memory access mode. A determination in the affirmative may result in micro-architectural agent 202 executing or otherwise accessing software instructions (or sub-instructions) and/or data specific to micro-architectural operation. In an embodiment, instructions and/or data specific to micro-architectural operation may include microcode, micro-code patch software, processor state information, and other micro-architecture specific information, etc. In an embodiment, memory access director 201a may direct a denied request to access the micro-architectural memory region to some other storage area, such as abort region 205b. In an embodiment, functions of memory access director 201a may be implemented with hardware (e.g. CMOS circuitry), software (e.g. microcode) or a combination of hardware and software.

Thus, in an embodiment, integrated circuit 201 has an input port to receive a memory access request (e.g. from a source internal or external to integrated circuit 201) and may communicate with system memory 205. In an embodiment, system memory 205 includes a micro-architectural memory region 205a that may store either instructions (e.g. microcode) or data, or both. In an embodiment, micro-architectural memory region 205a, may be accessed exclusively by micro-architectural agent 202. In an embodiment, integrated circuit 201 includes memory access director 201a to direct memory access requests to the micro-architectural memory region 205a if it determines that the following two conditions exist: (1) The request is for instructions and/or data stored within micro-architectural memory region 205a and (2) micro-architectural agent 202 is operating in a micro-architectural memory region access mode. In an embodiment, if the two conditions are not satisfied, memory access director 201a may direct the memory access request to abort memory region 205b in system memory 205. For example, in an embodiment, condition (1) and (2) will not be satisfied if the memory access request includes a location within the micro-architectural memory region 205a but the request did not originate from the micro-architectural agent 202, or the request originated from the micro-architectural agent 202 but it was not operating in the micro-architectural memory access mode.

Figure 3:
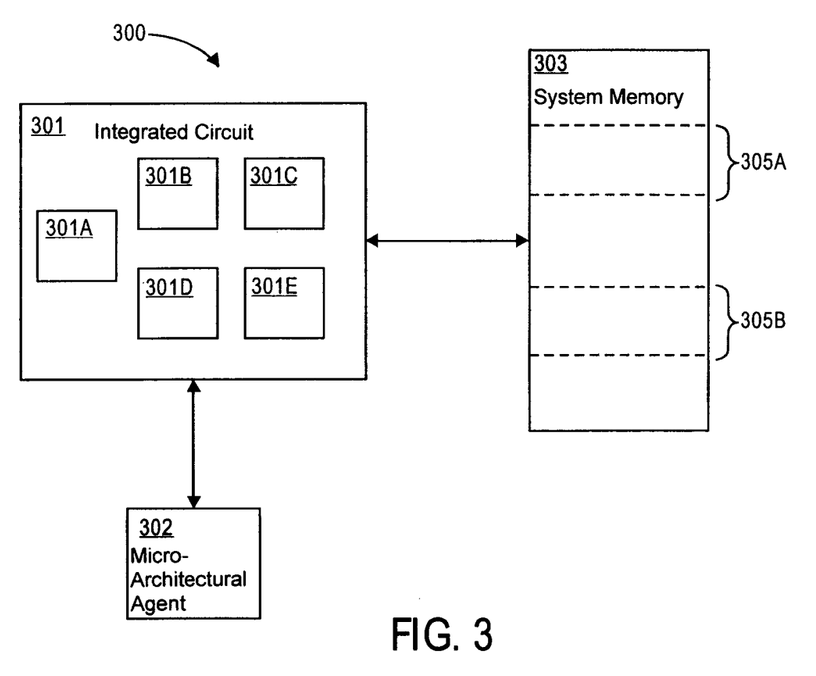
FIG. 3 illustrates a block diagram an information processing system, in which at least one embodiment of the invention may be used.

FIG. 3 is a block diagram illustrating an information processing system 300 in which at least one embodiment may be used. In an embodiment, integrated circuit 301 may include start-of-the-memory-region and end-of-the-region storage areas 301b, 301c to store values (e.g. sets of bits) that define micro-architectural memory region 305a within system memory 305. In an embodiment, region monitor 301d and access mode detector 301e may provide information to memory access director 301a about memory access requests at integrated circuit 301 from macro-architectural and/or micro-architectural agents, and other computer system agents, if any. For example, in an embodiment, region monitor 301d and access mode detector 301e may provide the addresses in memory that have been requested and the access mode in which its source operates.

In an embodiment, start-of-the-memory-region and end-of-the-memory-region storage areas 301b, 301c may include at least one register to store bits that indicate the start and end of micro-architectural memory region 305a. In other embodiments, the start-of-the-memory-region and end-of-the-memory-region storage areas 301b, 301c may include other storage devices or technologies. In an embodiment, range registers are implemented where the start-of-the-memory-region and end-of-the-memory-region storage areas 301b, 301c store first and second addresses that may define a micro-architectural memory region 305a consisting of contiguous memory addresses. In another embodiment, a base address may be stored in start-of-the-memory-region storage area 301b and be combined in a logical AND operation with a mask value stored in end-memory-region storage area 301c. A masking operation known by one having ordinary skill in the art may be adapted to employ the technique described above. In this embodiment, the result of the logical AND operation determines the range of the region designated as micro-architectural memory region 305a.

In an embodiment, region monitor 301d includes logic (e.g. implemented by software instructions, circuitry, or their combination) to inspect memory access requests received by integrated circuit 301 or generated from within integrated circuit 301 and to determine whether a memory access request falls within the micro-architectural memory region 301a. In an embodiment, region monitor 301d may include at least one storage area (not shown) to store first set of bits that correspond to memory addresses defining the micro-architectural memory region 305a. Region monitor may store a second set of bits that represent the memory address(es) requested by a memory access request. In an embodiment, region monitor 301d may obtain the memory addresses defining micro-architectural memory region 305a from start-of-the-memory-region and end-of-the-memory-region storage areas 301b, 301c. Region monitor 301d logic may then determine whether the received memory access request indicates location(s) within micro-architectural memory region 305a (e.g. by performing operations and/or calculations to compare the location of the memory access request with the boundaries of micro-architectural memory region 305a) and provide this information to memory access director 301a. In an embodiment, an input bit to memory access director 301a indicating a logical high value may relay that the memory access request indicates location(s) within the micro-architectural memory region 305a.

In an embodiment, micro-architectural agent 302 informs access mode detector 301e and memory access director 301a whether or not micro-architectural agent 302 is operating in the micro-architectural memory access mode. Access mode detector 301e may then inform memory access director 301a of the information. For example, in an embodiment, before micro-architectural agent 302 (e.g. within a processor or processor core) operating in the micro-architectural memory region access mode begins making a set of memory access requests to micro-architectural memory region 305a, it will first set a bit stored in a storage area (e.g. a register, or other storage device, not shown) within or in communication with integrated circuit 301.

In an embodiment, access mode detector 301e includes logic to indicate to memory access director 301a whether the source of a memory access request is a micro-architectural agent (e.g. micro-architectural agent 302) that is operating in micro-architectural memory access mode. In an embodiment, when a memory access request arrives at integrated circuit 301 or is generated on integrated circuit 301, access mode detector 301e is triggered to check the value of the bit stored on the integrated circuit to discover whether the source of the memory access request is micro-architectural agent 302 operating in the memory access mode. If the bit indicates a logically high value, then subsequent memory access request(s) may be determined by memory access detector 301e to be from micro-architectural agent 302 operating in the micro-architectural memory region access mode. If the bit indicates a logically low value, then memory access detector 301e may conclude that micro-architectural agent 302 did not make the request or is not operating in the micro-architectural memory access mode. In an embodiment, when micro-architectural agent 302 operating in the micro-architectural memory access mode is finished making the set of memory access requests, it may set the bit to indicate that subsequent memory access requests should not be given access to micro-architectural memory region 305a. Once access mode detector 301e makes its determination available to memory access director 301a, memory access director 301a may in turn either direct a memory access request to micro-architectural memory region 305a or to abort region 305b.

In an embodiment, access mode detector 301e determines from each memory access request whether the source of a memory access request is operating in the micro-architectural memory region access mode. In other words, the determination may be made on a transactional basis. For example, in an embodiment, each time a memory access request arrives at integrated circuit 301 or is generated on integrated circuit 301, access mode detector 301e may inspect the memory access request for an indication that the source is micro-architectural agent 302 operating in the micro-architectural memory region access mode. In an embodiment, access mode detector 301e may read a set of bits embedded in the memory access request to determine the access mode of the source of the request.

Thus, in an embodiment, integrated circuit 301 may include a first and second storage area (e.g. start-of-the-memory-region and end-of-the-memory-region storage areas 301b, 301c) to store a first and second set of bits (e.g. where each set of bits represents an address in system memory 305) that define the at least one micro-architectural memory region 305a. In an embodiment, integrated circuit 301 may additionally include region monitor 301d to determine whether incoming memory access requests indicate location(s) within the micro-architectural memory region 305a. In an embodiment, access mode detector 301e may detect whether incoming memory access requests originate at micro-architectural agent 302 operating in the micro-architectural memory region access mode or not. Region monitor 301d and access mode detector 301e are each equipped with means known by those having ordinary skill in the art to make its determination available to memory access director 301a (e.g. bits that indicate a determination may be stored in a readable storage area). In an embodiment, access director 301a uses these inputs to direct the memory access requests to an appropriate destination (e.g. to architectural memory region 305a, an abort region 305b, or another memory region).

There may be numerous ways for access mode detector 301e to detect the mode in which the source of a memory access request is operating. For example, in an embodiment, access mode detector 301e makes the detection by reading a set of bits stored by the micro-architectural agent 302 within the integrated circuit 301. In another embodiment, access mode detector 301e makes the detection by reading a first set of bits encoded within the memory access request.

In an embodiment, integrated circuit 301 is a processor that includes micro-architectural agent 302. Processor may include architectural agent(s) in addition to micro-architectural agent 302. In an embodiment, a set of information (e.g. instructions and/or data) stored within the micro-architectural memory region 305a may be accessed by the processor for the purpose of implementing a micro-processor instruction and/ or to store micro-processor state information.

Figure 4:
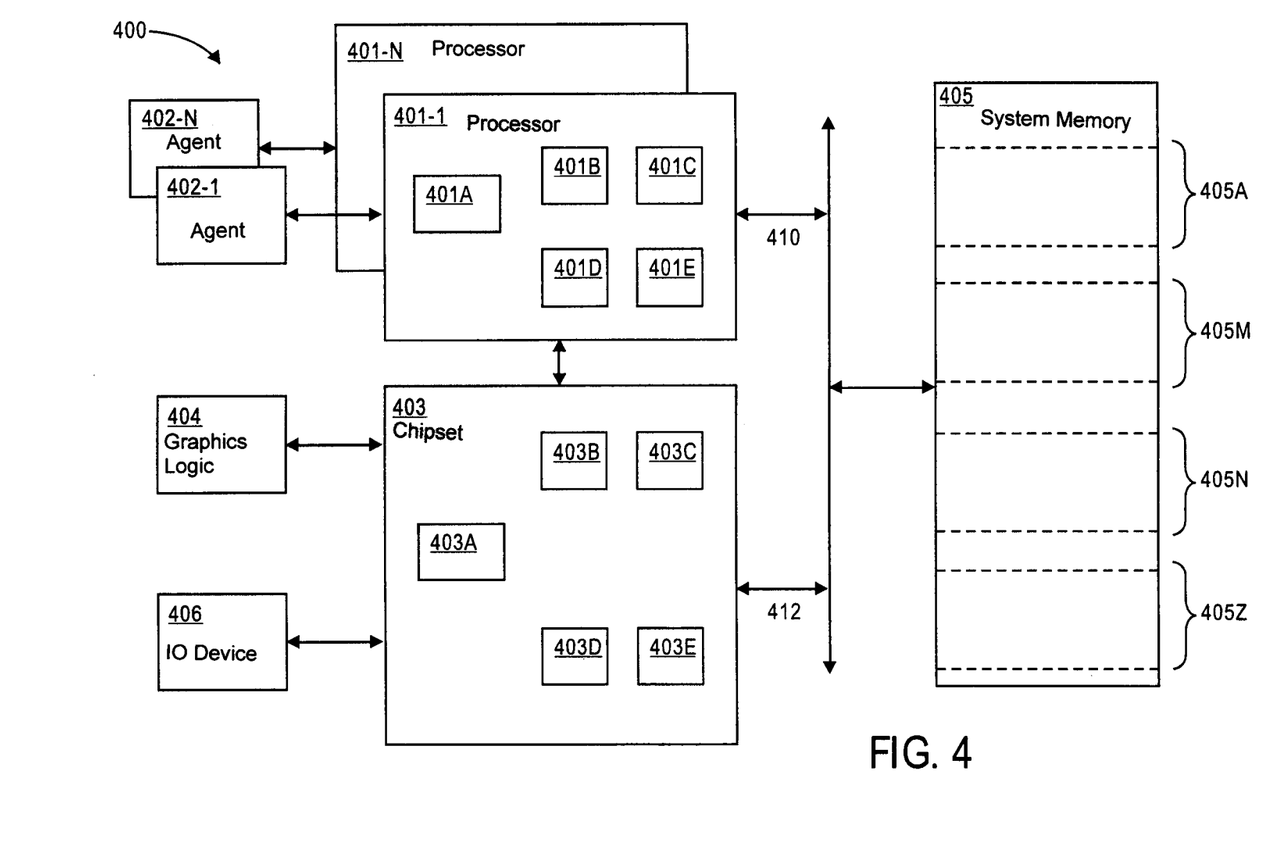
FIG. 4 illustrates a block diagram an information processing system, in which at least one embodiment of the invention may be used.

FIG. 4 is a block diagram illustrating an information processing system 400 in which an embodiment of the present invention may be practiced. In FIG. 4, processors 401-1 to 401-N are in communication with micro-architectural agent 402-1 to 401-N respectively. In an embodiment, micro-architectural agents 402-1 to 402-N may reside within processor 401-1 to 401-N respectively and processor 401-1 to 401-N may include other micro-architectural agents (not shown). As described with respect to corresponding components of integrated circuit 301 in FIG. 3, processors 401-1 to 401-N and chipset 403 may each include memory access director 401a, 403a, start-of-the-memory-region 401b, 403b, end-of-the-memory-region 401c, 403c, region monitor 401d, 403d and access mode detector 401e, 403e. Chipset 403 may be in communication with I/O device(s) 406 and graphics logic 404 via communication bus (e.g. any communication bus known in the art suitable to provide system component communication may be used).

In an embodiment, processors 401-1 to 401-N and chipset 403 communicate with system memory 405. System memory 405 may include a plurality of micro-architectural memory regions 405a to 403m and a plurality of abort memory regions 405n to 405z. In an embodiment, each of micro-architectural memory regions 405a to 405m and abort memory regions 405n to 405z may be similar in function and structure to micro-architectural memory regions 205a, 305a and abort memory region 205b, 305b described in FIGS. 2 and 3 respectively. In an embodiment, the plurality of processors 401-1 to 401-N may share access to micro-architectural memory region 205a.

In an embodiment, memory access requests may arrive at processors 401-1 to 401-N and chipset 403 from macro-architectural agents such as I/O devices, system software and/or hardware and/or micro-architectural agents such as micro-architectural agents 402-1 to 402-N. The techniques described herein may be incorporated with processors 401-1 to 401-N and chipset 403 to control access to micro-architectural memory regions 405a to 405m so that they may be reserved for access by micro-architectural agents 402-1 to 402-N, and any other authorized micro-architectural agents.

Thus, in an embodiment, processor 401-1 to 401-N each include hardware and/or software configured to filter out unauthorized memory access requests directed at the micro-architectural memory region. In other words, processors 401-1 to 401-N and chipset 403 each store the same sets of bits in their start-of the-memory-region and end-of-the-memory-region storage areas 401b, 403b, 401c, 403c and consequently, processors 401-1 to 401-N and chipset 403 share the same micro-architectural memory region 405a.

In an embodiment, processor 401-N does not store the same sets of bits in its start-of the-memory-region and end-of-the-memory-region storage area as chipset 403 and processors 401-1 to 401-M. Thus, in an embodiment, one of the plurality of processors 401-N does not share a micro-architectural memory region 405a with the other processors 401-1 to 401-M and chipset 403.

Figure 5:
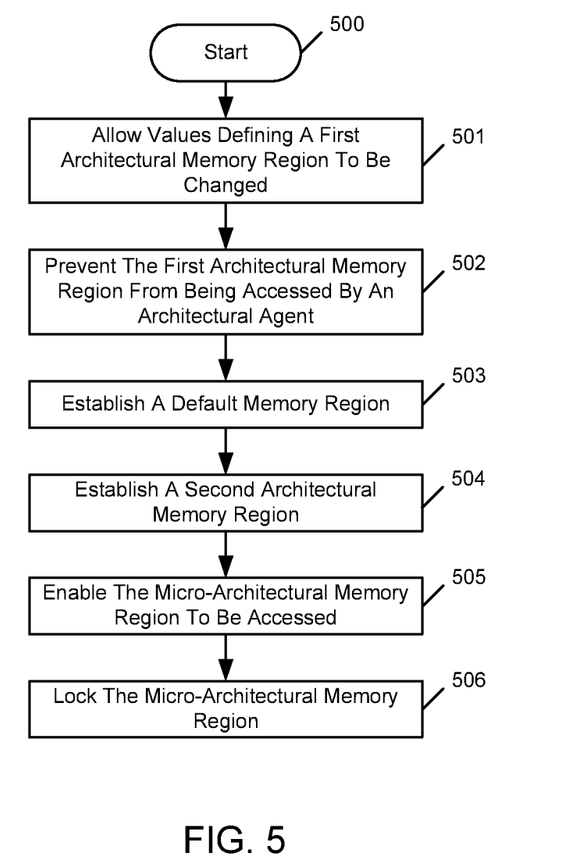
FIG. 5 is a flow diagram of operations that may be used for establishing a micro-architectural memory region, according to one embodiment of the invention.

FIG. 5 is a flow diagram of operation 500 that may be used for establishing a micro-architectural memory region according to an embodiment of the invention.

At operation 501, values that define a micro-architectural memory region are allowed to be manipulated. In an embodiment, the values were previously locked to prevent the size and/or location of the micro-architectural memory region in system memory from being changed (e.g. by a macro-architectural agent such as the operating system or a user level application). In an embodiment, only processor hardware, microcode, and "trusted modules" (described below) can unlock and change the values that define a micro-architectural memory region after they are locked.

In an embodiment, microcode performs operation 501. Alternatively and/or additionally, microcode includes scrubbing microcode to detect whether the first micro-architectural memory region has been flagged to be erased to insure that certain information does not remain in system memory, possibly unprotected. To meet this end, the establishment of subsequent micro-architectural memory regions may be inhibited until the scrubbing microcode has erased the contents of the first micro-architectural region. Alternatively, a "trusted module" is used to carry out the erasing operation described above in response to the detected flag. In an embodiment, a "trusted module" may be software whose identity is required to be authenticated by a micro-architectural agent in order to be executed.

At operation 502, a micro-architectural agent that previously had access to the first micro-architectural memory region is disabled from having access. In an embodiment, disabling access may include microcode changing the logical value of a bit whose value indicates whether a micro-architectural memory region may be accessed.

At operation 503, a "default" micro-architectural memory region (e.g. a region with a known, stable state) is established. In an embodiment, the default micro-architectural memory region is set up by microcode in response to a system reset signal and alternatively or additionally, in response to executing microcode that initiates a reset of the micro-architectural memory region.

At operation 504, a "programmed" micro-architectural memory region is established. In an embodiment, the values defining the programmed micro-architectural memory region of operation 504 are received from system software, such as a macro-architectural agent (e.g. BIOS, OS, etc.).

At operation 505, the programmed micro-architectural memory region is enabled, giving the micro-architectural agent access to the region. In an embodiment, once enabled, an access to the programmed micro-architectural memory region made outside of the micro-architectural memory region access mode may cause access to be directed to an abort memory region.

At operation 506, the setup may conclude when the programmed micro-architectural memory region is locked to prevent unauthorized changes to its size and/or location in system memory. In an embodiment, the BIOS sets a lock bit to lock the programmed micro-architectural memory region after it has been enabled to be accessed by the micro-architectural agent.

In an embodiment, whether a micro-architectural memory region is enabled in operation 505, or at another operation may depend on the status of some condition or conditions (e.g. protection and/or security conditions) related to the micro-architectural memory region. In an embodiment, the trusted module may be used to carry out various operations (e.g. operations to provide protection and/or security checks for the programmed micro-architectural memory region) leading to enablement. In an embodiment, a trusted module's identity is authenticated by a micro-architectural agent before it is given access to enable micro-architectural memory region. In an embodiment, before protection and/or security operations are run, the size, location and contents of the micro-architectural memory region may be locked to prevent changes while the protection/security operations are running.

In an embodiment, to check for a level of protection and security, the extent of any discontinuities due to aliasing between system memory 303 and other system components may be evaluated. An intolerable level of discontinuity may be considered to render the micro-architectural region unprotected/insecure. In an embodiment where there is more than one micro-architectural agent (e.g. a processor) having access to the system memory, a check may insure that the micro-architectural agents share a common micro-architectural memory region. In embodiments where there are regions of memory other than micro-architectural memory region, a check to insure that the other region or regions do not overlap with micro-architectural memory region may be required. In an embodiment, if the other region or regions overlap then the micro-architectural memory region may not be considered to be protected and secure. In an embodiment, system memory includes a plurality of micro-architectural memory regions. In an embodiment, protection and security check operations may insure that each micro-architectural memory region is protected from unauthorized accesses originating from any device or agent having a communication path to system memory. In an embodiment, protection/security operations insure that each communication path to system memory includes means to filter out unauthorized memory access requests to the micro-architectural memory region (e.g. memory access director, and other hardware and/or software, described above).

In an embodiment, the setup operations described above may be performed on each of a plurality of processors and a chipset that each access system memory. In other words, each of the processors and the chipset may be set up to protect the micro-architectural memory region. In an embodiment, there is a communication path between each processor and the chipset. In order to insure that the processors are set up to access the same micro-architectural memory region, checking and protection operations may include comparing the values stored on each processor that define the micro-architectural memory region with the defining values stored on the common chipset. Reorganizations of a platform caused by an operating system may cause the micro-architectural memory region to have been relocated. In such cases, pre-enablement operations may include inspecting system topology to insure that protections have been re-inspected and/or checked. Pre-enablement protection and/or security requirements may be set to a desired level. If the results of the various protection and security operations indicate that the desired level of protection and/or security have been achieved, the enable of operation 505 may proceed.

Figure 6A:
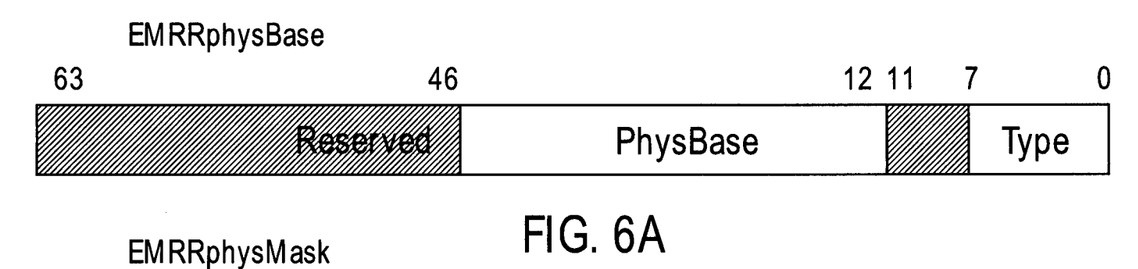
FIG. 6 illustrates micro-architectural memory region range registers that may be used to direct memory accesses, according to one embodiment of the invention.
Figure 6B:
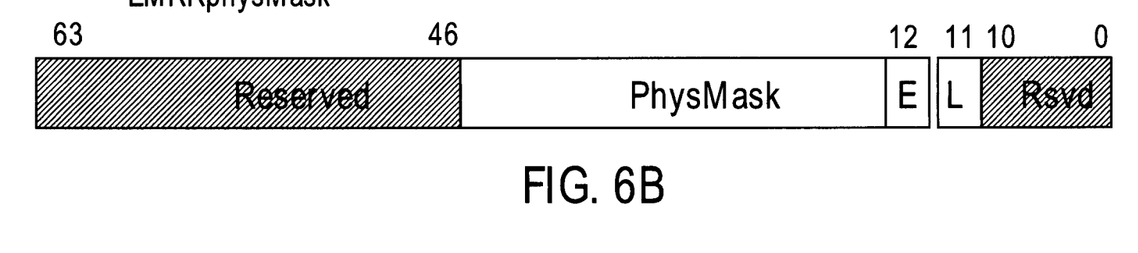

FIG. 6 illustrates micro-architectural memory region range registers 6a and 6b that may be used to direct memory accesses, according to an embodiment of the invention. As disclosed above with respect to FIG. 3, in an embodiment, start-of-the-memory-region and end-of-the-memory-region storage areas 301b, 301c may be registers located within the integrated circuits. In addition to those registers, embodiment(s) may also include storage areas for a micro-architectural memory region enable indicator, a lock micro-architectural memory region indicator and a cache memory type indicator (none shown).

In an embodiment, the memory type of the micro-architectural memory region may be stored in bit 0 through 7 of the register labeled "EMRRphysBase" in FIG. 6a. In an embodiment, bits between 12 through 46, labeled "PhysBase" (e.g. start-of-the-memory-region storage 305b) may be used to store the address where the micro-architectural memory region begins. In FIG. 6b, a register labeled "EMRRPhysMask" is shown. In an embodiment, bit 10 may store a bit that indicates whether the micro-architectural memory region is locked or whether its size or location may be manipulated. In an embodiment, bit 11 stores a bit that indicates whether the micro-architectural memory region is protected/secure to be enabled to be accessed under certain conditions. In an embodiment, bits 12 through 46, labeled "PhysMask" (e.g. end-of-the-memory-region 305c) may store a value that indicates the limit of the micro-architectural memory region. In an embodiment, the limit value is derived through masking the value stored in "PhysBase." Masking binary values to create a limit on a range is a technique known by those having ordinary skill in the art. In another embodiment a limit address to indicate a boundary of the micro-architectural memory region may simply be provided.

Other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

In an embodiment, the software used to facilitate the routine can be embedded onto a machine-readable medium. A machine-readable medium includes any mechanism that provides (i.e., stores) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), etc.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
removing, by microcode of a processor, a lock that prevents alteration of a set of values by a macro-architectural agent of the processor, the lock corresponding to a lock indicator of a first memory region range register of the processor accessible to a region monitor of the processor, the set of values including a first set of values that define a first micro-architectural memory region of a system memory located within a computer system, wherein the first micro-architectural memory region is established subsequent to erasure of a previous micro-architectural memory region, the erasure effected by use of a scrubbing microcode;

disabling, by the microcode, the first micro-architectural memory region from being accessible by one or more micro-architectural agent that previously had access to the first micro-architectural memory region by changing an enable indicator of the first memory region range register to indicate that the first micro-architectural memory region cannot be accessed;

replacing, by the microcode, the first set of values with a second set of values to establish a default memory region of the system memory corresponding to a known, stable state in response to the microcode initiation of a reset of the first micro-architectural memory region;

receiving a third set of values from the macro-architectural agent, the third set of values to define a second micro-architectural memory region, wherein the third set of values replace the second set of values to establish the second micro-architectural memory region subsequent to replacement of the first set of values with the second set of values by the scrubbing microcode; and thereafter updating the enable indicator of the first memory region range register to indicate that that the second micro-architectural memory region is enabled to be accessed by the one or more micro-architectural agent and updating the lock indicator of the first memory region range register.

2. The method of claim 1, wherein the third set of values are received from system software associated with the computer system, wherein the system software is stored external to the one or more micro-architectural agent.

3. The method of claim 1, wherein the second micro-architectural region is caused to be enabled when one or more conditions related to the second micro-architectural region is satisfied, and wherein the second micro-architectural region is accessible exclusively by the one or more micro-architectural agent when the second micro-architectural region is enabled.

4. The method of claim 3, further comprising:
erasing a first set of memory locations within the first micro-architectural memory region via the scrubbing microcode before the second micro-architectural memory region is caused to be enabled.

5. The method of claim 3, wherein the one or more conditions related to the second micro-architectural memory region is selected from the group consisting of
detecting no overlap between the second micro-architectural memory region and an other memory region of the system memory, detecting that a plurality of micro-architectural agents within the computer system share the second micro-architectural memory region, and detecting that a set of communication paths to the second micro-architectural memory region are secure.

6. The method of claim 5, wherein the one or more micro-architectural agent includes one or more processors, and wherein a chipset is used as a common reference to detect whether the plurality of micro-architectural agents share the second micro-architectural memory region.

7. The method of claim 3, wherein the set of values is locked to prevent the first set of values from being changed without authorization.

8. An apparatus comprising:
a processor to receive a memory access request and to be coupled with a system memory, wherein the system memory includes at least one micro-architectural memory region that is to store one or more of instructions and data and is to be exclusively accessible by a micro-architectural agent of the processor, wherein the at least one micro-architectural memory region is established subsequent to erasure of a previous micro-architectural memory region, wherein the processor includes:
a memory access director to direct the memory access request to the at least one micro-architectural memory region based on a determination by a region monitor and an access mode detector of the processor that the memory access request originated from the micro-architectural agent and includes a location within the at least one micro-architectural memory region and that the micro-architectural agent is operating in a micro-architectural memory region access mode, and otherwise to prevent the access to the at least one micro-architectural memory region;
a plurality of storage areas in the processor including first and second memory region range registers accessible to the region monitor to store first and second sets of bits including address information respectively that define the at least one micro-architectural memory region within the system memory, the first memory region range register further to store a plurality of bits to define a cache memory type of the at least one micro-architectural memory region and the second memory region range register further to store an enable indicator to indicate that the at least one micro-architectural memory region is enabled to be accessed by the micro-architectural agent and to prevent an access to the at least one micro-architectural memory region from outside the micro-architectural agent;
a lock indicator to indicate whether the at least one micro-architectural memory region is locked from having its location and/or size in the system memory manipulated; and
scrubbing microcode to erase the previous micro-architectural memory region.

9. The apparatus of claim 8, wherein the memory access director is to direct the memory access request to an abort memory region located within the system memory if the memory access request includes a location within the at least one micro-architectural memory region and detects at least one of that the micro-architectural agent did not originate the request and that the micro-architectural agent is not operating in the micro-architectural memory region access mode.

10. The apparatus of claim 9, wherein access to the abort memory region is to result in the access being ignored.

11. The apparatus of claim 9, wherein access to the abort memory region is to result in the access being flushed from the processor.

12. The apparatus of claim 9, wherein access to the abort memory region is to result in return of a null value.

13. The apparatus of claim 9, wherein microcode of the processor is a micro-architectural agent and is to establish the at least one micro-architectural memory region and to update values of the first and second sets of bits to define the at least one micro-architectural memory region.

14. The apparatus of claim 13, wherein the microcode is to establish the at least one micro-architectural memory region responsive to a system reset.

15. The apparatus of claim 8, wherein the micro-architectural agent is to set the enable indicator in the second memory region range register of the processor to indicate that the micro-architectural agent is to operate in the micro-architectural memory region access mode.

16. The apparatus of claim 15, wherein a basic input/output system (BIOS) is to lock the second memory region range register after the micro-architectural agent sets the enable indicator of the memory region range register.

17. The apparatus of claim 8, wherein the processor is to prevent an operating system (OS) from access to the at least one micro-architectural memory region.

18. The apparatus of claim 8, wherein the at least one micro-architectural memory region is powered by a separate power plane than a non-micro-architectural memory region of the system memory.

19. The apparatus of claim 8, wherein the at least one micro-architectural memory region is to store a microcode patch.

20. A system comprising:
- a system memory including at least one micro-architectural memory region that is to store one or more of instructions and data and to be exclusively accessible by a micro-architectural agent of a processor, and an abort memory region to serve as a target to receive unauthorized accesses to the at least one micro-architectural memory region and not including the one or more instructions and data, wherein the at least one micro-architectural memory region is established subsequent to erasure of a previous micro-architectural memory region;
- a chipset coupled between the processor and the system memory, wherein the chipset includes a memory access director to direct a memory access request having an address within the at least one micro-architectural memory region to the at least one micro-architectural memory region if the memory access request includes a location within the at least one micro-architectural memory region and the micro-architectural agent is operating in a micro-architectural memory region access mode, and otherwise to direct the memory access request to the abort memory region, wherein access to the abort memory region is to result in the access being flushed from the processor; and
- scrubbing microcode to erase the previous micro-architectural memory region.

21. The system of claim 20, wherein the chipset further comprises:
- a plurality of storage areas including a first and second storage area to store a first and second set of bits including address information that define the at least one micro-architectural memory region;
- a region monitor coupled to the memory access director to determine whether the memory access request includes the location within the at least one micro-architectural memory region; and
- an access mode detector coupled with the memory access director to detect whether the memory access request originated at the micro-architectural agent operating in the micro-architectural memory region access mode.

22. The system of claim 20, further comprising a plurality of processors, wherein each of the plurality of processors and the chipset share the at least one micro-architectural memory region within the system memory.

* * * * *